UNITED STATES PATENT OFFICE.

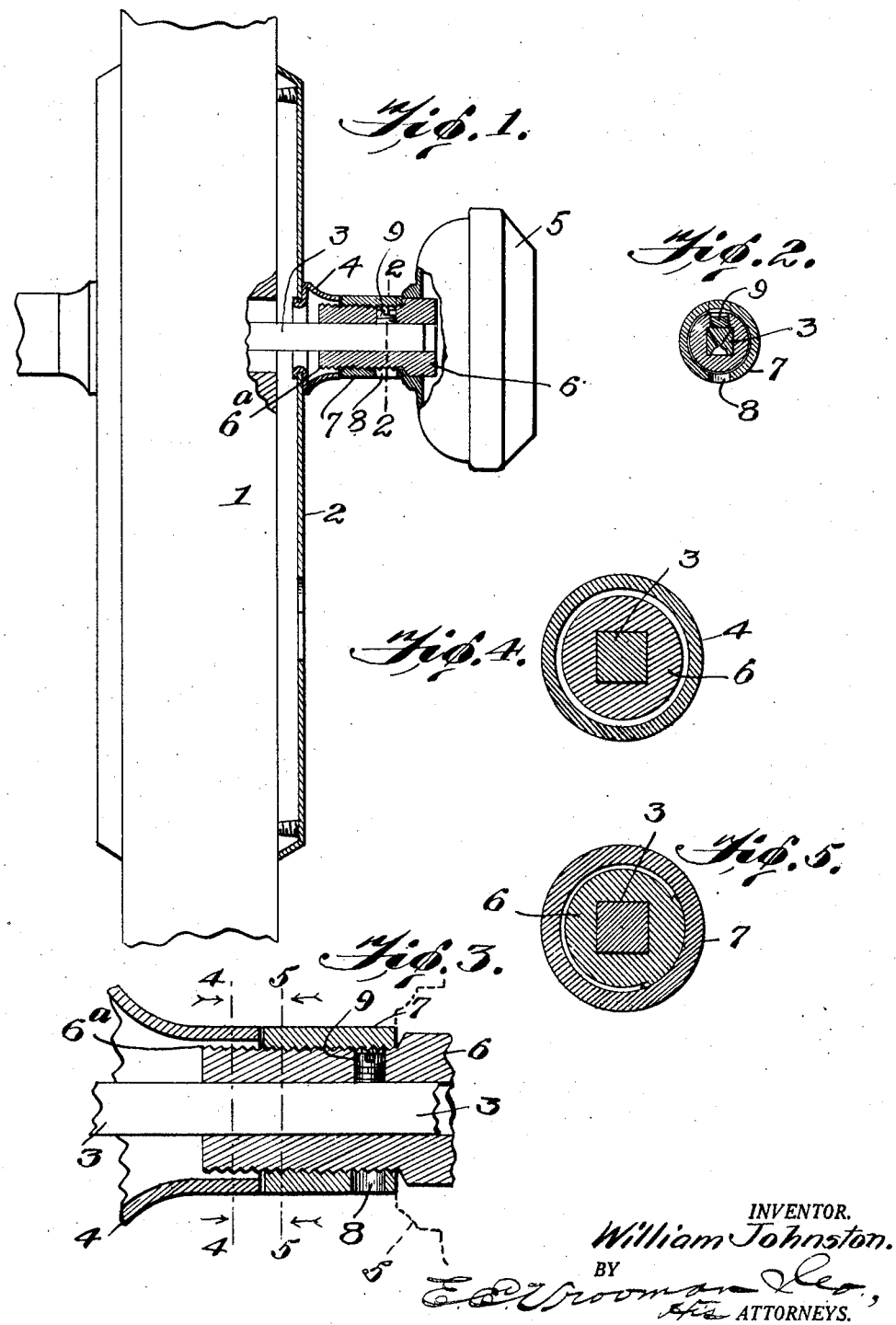

WILLIAM JOHNSTON, OF GREAT FALLS, MONTANA, ASSIGNOR OF ONE-HALF TO ANNIE W. SHIELL, OF GREAT FALLS, MONTANA.

SAFETY DEVICE FOR DOORKNOBS.

Application filed April 22, 1926. Serial No. 103,821.

This invention relates to improvements in door knobs, and more particularly to a structure whereby the knob is prevented from accidentally becoming displaced off its spindle.

The object of the invention is the construction of a simple and efficient device for retaining the fastening screw from becoming unseated or disconnected from the shank, except when the operator deliberately removes the screw.

With this and other objects in view, my invention consists of certain novel constructions, combinations and arrangements of parts, as will be hereinafter fully described, illustrated in the accompanying drawings, and more particularly pointed out in the appended claim.

In the drawings:

Figure 1 is a view partly in section and partly in elevation of an embodiment of the present invention.

Figure 2 is a sectional view taken on line 2, 2, Figure 1.

Figure 3 is an enlarged fragmentary, longitudinal sectional view of the present invention.

Figure 4 is a sectional view taken on line 4, 4, Figure 3, and looking in the direction of the arrows.

Figure 5 is a sectional view taken on line 5, 5, Figure 3, and looking in the direction of the arrows.

Referring to the drawings by numerals, 1 designates the door to which plate 2 is secured. Extending through the door 1 is spindle 3. Surrounding the spindle and fastened at its inner end to plate 2 is a collar 4. A knob 5 is mounted upon the outer end of shank 6, which shank is screw-threaded on its outer face to its inner end $6^a$ for receiving the internally screw-threaded sleeve 7. Sleeve 7 is provided with a screw receiving aperture 8, through which screw 9 is passed, when screw 9 is inserted into the shank 6, whereupon the screw is screwed tight against spindle 3 to hold the knob thereon. Then by slightly turning the threaded sleeve 7 so as to place aperture 8 out of alignment, or registering position with the top of the screw 9, as shown in Figure 2, the screw can not become unseated off the spindle and shank. My sleeve 9 abuts at its inner end against the outer end of collar 4 and at its outer end against the knob 5. The inner threaded end $6^a$ of said shank extends under said collar 4 for allowing accurate assembling of the elements of my complete device. By having the device so constructed, I have found from actual experience with a working model that I have produced a decided improvement over all prior patented devices.

While I have described the preferred embodiments of my invention, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

As a new article of manufacture, a safety device for door knobs, comprising a plate provided with a collar extending therefrom, a spindle extending through said plate and collar, a knob provided with a shank, said shank mounted on said spindle, said shank being externally screw-threaded from the knob to its inner end, said inner threaded end of the shank under said collar, an internally threaded sleeve on said shank and having one end abutting against the outer end of said collar and its opposite end abutting against a portion of said knob, and a screw in said shank under said collar and against said spindle, substantially as shown and described.

In testimony whereof I hereunto affix my signature.

WILLIAM JOHNSTON.